Figure 1:
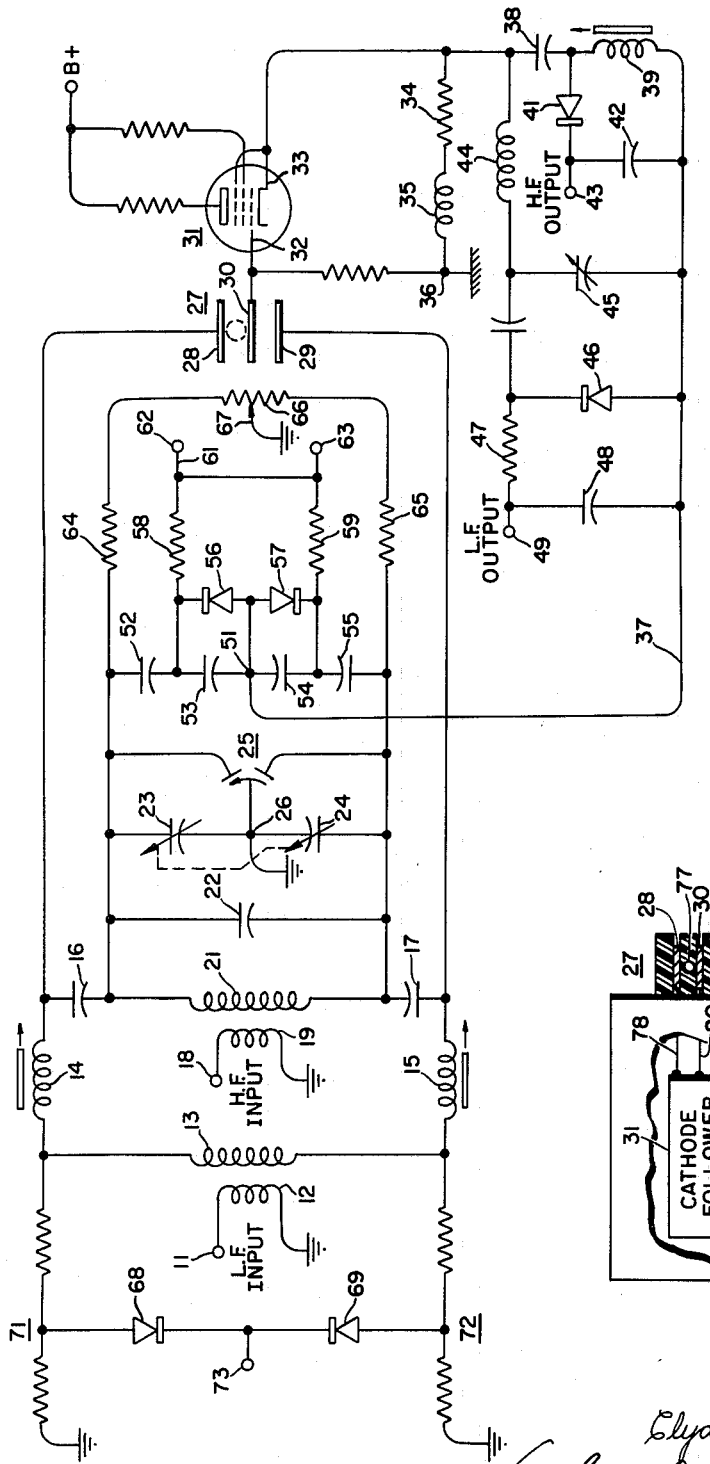

Feb. 8, 1966 C. W. BAIRD 3,234,460
SYSTEM FOR MEASURING A PROPERTY OF A DIELECTRIC MATERIAL BY
APPLYING SIGNALS AT TWO DIFFERENT FREQUENCIES TO
A CAPACITANCE PROBE THROUGH TUNED INPUT CIRCUITS
Filed Sept. 20, 1960

INVENTOR
Clyde W. Baird
By Anthony D. Cennamo

United States Patent Office 3,234,460
Patented Feb. 8, 1966

3,234,460
SYSTEM FOR MEASURING A PROPERTY OF A DIELECTRIC MATERIAL BY APPLYING SIGNALS AT TWO DIFFERENT FREQUENCIES TO A CAPACITANCE PROBE THROUGH TUNED INPUT CIRCUITS
Clyde W. Baird, Columbus, Ohio, assignor to Industrial Nucleonics Corporation, a corporation of Ohio
Filed Sept. 20, 1960, Ser. No. 57,234
6 Claims. (Cl. 324—61)

This invention relates generally to improved measuring circuits of the type employed for measuring the properties of a product produced in a continuous industrial process.

Many forms of gauging operations are performed on continuously produced products in which the product passes a measuring station located on the product line where the product is subjected to the influence of the measuring system. In view of the many advantages of non-contacting gauges in which the properties to be measured are determined without actually requiring any instrumentality to touch the product as it moves in the industrial process, many present day gauging systems are of this type. One such family of measuring systems of this type utilizes a capacitive measuring head in which the product passes where it is subjected to an electromagnetic field corresponding to the alternating potential to which the capacitor head is connected. If the product is a dielectric material this form of gauge can be utilized to detect a property of the product in accordance with the variation in capacitance caused by the corresponding change of the dielectric constant of the product as it passes through the capacitive measuring head.

Recently the extension of capacitive measuring systems to permit the determination of a plurality of properties of a product which is being manufactured has been provided. In the copending applications of Chope Serial No. 41,971, now U.S. Patent 3,155,898, issued November 3, 1964 and of Hanken Serial No. 41,975 now U.S. Patent 3,155,900, issued November 3, 1964, both assigned to the assignee of the present application, systems are disclosed for subjecting the product of an industrial process to a plurality of distinct frequency electromagnetic fields and determining from the variation in response produced at each frequency a plurality of properties of the material. In the aforementioned Hanken application this multi-frequency electromagnetic gauging system is disclosed with two distinct frequencies for the determination of the weight per unit length and relative moisture content of a cigarette rod during the manufacture of cigarettes. For this purpose two frequencies are applied to a bridge circuit which includes in one arm thereof a measuring capacitor of suitable structure to receive the cigarette rod as it is being manufactured.

The present invention relates to improvements in the circuits of the measuring head employed with systems of the types described in the aforementioned co-pending applications particularly with reference to capacitive type measuring heads in which a product is to be subjected to a plurality of distinct frequencies and a signal is to be derived at each of the frequencies. In the operation of systems of this type it has been found that the signal at each frequency is greatly enhanced if the circuit associated with the measuring head at a particular frequency is resonant at that frequency and the detecting circuit which detects the influence of the product passing through the capacitive probe of the measuring head is also arranged to be resonant at the respective test frequencies. The present invention provides an improved multiproperty gauging system employing a plurality of test frequencies which are applied to the product in the capacitive probe in which the product passes. The probe forms a part of a multi-resonant circuit arranged to permit the capacitance of the probe to be part of a circuit which is resonant in each of the test frequencies and arranged in a manner which permits the signal detector to derive a signal at each of the frequencies. The detected signals may be further enhanced by resonance at the respective frequencies prior to rectification. In this manner a plurality of D.C. signals are derived which have maximum sensitivity to variations in the product as they influence the capacitance of the measuring probe due to the variation of the individual properties of the material passing between the capacitor plates.

It is an object of the present invention to provide an improved measuring circuit for electromagnetic measuring systems in industrial processes.

A further object of the invention is to provide a measuring system employing electromagnetic energy in which the measurement is conducted under conditions of resonance for each frequency employed.

A further object of the invention is to provide a dual frequency resonant measuring head for a multi-property electromagnetic detection system.

A further object of the invention is to provide a resonant measuring head and resonant detector circuit operable at a plurality of frequencies and resonant at each frequency whereby a plurality of signals may be derived and detected with maximum sensitivity.

Figure 2:
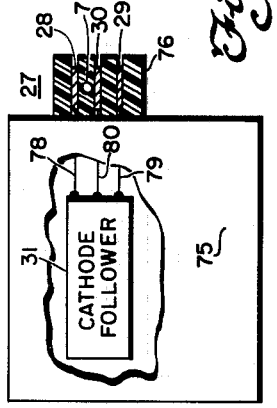

These and other objects of the invention will be apparent from the following detailed description taken in conjunction with the accompanying drawings wherein:

FIG. 1 is a schematic wiring diagram of a dual frequency resonant measuring circuit and detector circuit in accordance with the invention; and FIG. 2 is a perspective view of a measuring head according to the invention.

Referring now to FIG. 1 the wiring connections for a dual frequency capacitive probe will be described. A low frequency input terminal 11 is provided for the purpose of coupling a low frequency constant amplitude signal to a primary winding 12. The signal coupled to terminal 11 may be, for example, 500 kilocycles and the signal thus applied to winding 12 is coupled to a secondary winding 13. The signal in winding 13 is thus introduced in a circuit comprising the winding 13, a pair of adjustable inductors 14, 15 and capacitors 16, 17. The capacitors 16 and 17 are connected through the high frequency resonant circuit to be hereinafter described and form, together with inductors 14, 15 and secondary 13, a part of a parallel resonant circuit resonant at the frequency of the signal applied at input terminal 11.

A high frequency terminal 18 is connected to apply to a primary winding 19, a signal of, for example, 10 megacycles which is supplied to the input terminal 18. The winding 19 operates to couple a signal into a secondary winding 21 across which is connected a capacitor 22 which renders the combination including inductance 21 and capacitor 22 parallel resonant at approximately the frequency of the signal applied at input terminal 18. Across this combination is a butterfly type pair of ganged capacitors 23, 24 and a differential capacitor 25. The mid-point between the capacitors 23 and 24 and the common rotor of capacitor 25 are all connected to ground 26. The capacitors 23, 24 may be adjusted to resonate the resonant circuit comprising inductor 21 capacitor 22, capacitors 23, 24 and 25 while the adjustment of capacitor 25 may be made to provide balanced signals at the opposite ends of the resonant circuit corresponding to the junctions between coil 21 and the terminals of capacitors 23 and 24.

A capacitive measuring head 27 is connected between the inductors 14 and 15. The head 27 comprises two serial capacitors in the form of three capacitor electrodes or plates 28, 29 and 30. The plate 28 is directly connected to the junction of inductor 14 and capacitor 16 while the plate 29 is directly connected to the junction of inductor 15 and capacitor 17 thus placing the capacitance of the head 27 in the low frequency resonant circuit. By virtue of the magnitude of the capacitance of capacitors 16 and 17 the capacitance of the probe 27 is also connected in the high frequency resonant circuit comprising inductor 21 and capacitor 22. The high frequency circuit is connected by capacitors 16 and 17 acting as coupling capacitors to the plates 28 and 29.

The detector circuit for deriving signals from the head in accordance with the variation in capacitance produced by passing a product through one side thereof, for example between plates 28 and 30, utilizes a cathode follower stage 31. The cathode follower 31 has a grid 32 directly connected to the center capacitor plate 30 of the measuring head 27. Thus signals applied to the grid 32 appear with substantially unity gain at the cathode 33 and thus are applied to the load circuit connected to the cathode 33. This load circuit includes a bias resistor 34 and an inductive load 35 connected between the cathode 33 and chassis ground 36. Connected between the cathode 33 and a signal ground lead 37 is a series circuit comprising capacitor 38 and inductor 39 which is resonant at the frequency of the high frequency signal applied to terminal 18. To the junction of capacitor 38 and inductor 39 is connected a diode detector 41 which is connected to a detector capacitance 42 to supply at an output lead 43 a D.C. signal having a magnitude in accordance with the magnitude of the high frequency A.C. signal detected at plate 30 of the capacitive probe 27.

Also connected from the cathode 33 to signal ground lead 37 is an inductor 44 and a capacitor 45 which constitutes a series resonant circuit at the frequency of the low frequency signal applied at terminal 11. By virtue of the series inductance 44 the resonant circuit 44, 45 does not provide any appreciable loading at the high frequency signal nor disturb the resonance of the circuit 38, 39. A signal from the junction of inductor 44 and capacitor 45 is coupled to a shunt detector diode 46 to develop through a filter circuit comprising resistor 47 and capacitor 48 a D.C. output signal on terminal 49 the magnitude of which corresponds to the low frequency signal detected at plate 30 of the capacitive probe 27.

Signal ground lead 37 is connected to a mid-point 51 of a capacitive voltage divider comprising capacitors 52, 53, 54 and 55 connected across the high frequency resonant circuit. This capacitive voltage divider applies a fraction of the voltage on each side of signal ground point 51 to a detector circuit comprising diodes 56 and 57 which are connected for full wave rectification to supply through resistors 58, 59 a reference voltage on line 61 which may be supplied on terminal 62 to the measurement portion of the circuit. The junction of the resistors 58 and 59 is also connected to a test point 63. Also connected across the high frequency resonant circuit is a resistance voltage divider comprising resistors 64, 65 and potentiometer 66 which has its movable contact 67 connected to ground 26. By means of the adjustable contact 67 and the differential capacitor 25, adjustments can be made to provide both resistive and capacitive balancing with respect to ground 26.

The low frequency resonant circuit may be balanced by means of a detector circuit comprising diodes 68, 69 which are connected across voltage dividers 71, 72 connected to the low frequency secondary 13. Resonance in the low frequency resonant circuit may be obtained by adjustment of inductors 14 and 15 for a maximum reading on test point 73.

Referring now to FIG. 2 the structure of a capacitive measuring head will be described which is useful for measuring with two measurement frequencies the properties of a cigarette rod during the manufacture thereof. The measurement head 75 houses the cathode follower stage 31 which is connected to the plate 30 of the capacitor assembly 27 as shown. The capacitor assembly 27 is arranged as a projection on the measuring head 75 formed of a plurality of insulating plates 76 stacked with the plates 28, 30 and 29 secured therebetween. In the dielectric plate 76 directly above the plate 30 an axial hole 77 is provided to receive the cigarette rod as it travels in the course of its manufacture. The plate 28 has a projection 78 extending into the preamplifier housing 75 for the purpose of electrically connecting the plate 28 to the circuit as described in FIG. 1. Similarly the plate 29 has a projection 79 and the plate 30 has a projection 80. The projections 78, 79 and 80 may be flat conductive strips which project from the capacitive assembly 27 between the dielectric blocks 76. This assembly provides a rigid construction with a constant basic capacitance which is unchanged by mechanical vibration, humidity or other factors encountered in the cigarette factory.

The apparatus of FIGS. 1 and 2 is calibrated and set up for operation in accordance with the following procedure. The high and low frequency signals are applied to the input terminals 11 and 18 respectively. The coil 39 is adjusted to resonate with the capacitor 38 for the high frequency signal and the capacitor 45 is adjusted to resonate with the inductor 44 for the low frequency signal. The inductors 14 and 15 are adjusted to produce resonance at the low frequency while the capacitors 23, 24 are adjusted in equal amounts to produce resonance in the high frequency circuit as indicated by a maximum voltage at test points 73 and 63 respectively. The output signals at the output terminals 43 and 39 are then observed and a minimum output is obtained by the adjustment of capacitor 25, potentiometer tap 67 and the relative setting of inductors 14 and 15.

With the resonances so adjusted the system may be operated in the fashion described in the aforementioned copending Hanken application Serial No. 41,975 to derive the mass and moisture of material inserted as the dielectric of the measuring probe formed by the electrodes 28 and 30. Balanced input signals 180° out of phase are applied to the measuring probe comprising electrodes 28 and 30 and to the balancing capacitor comprising electrodes 29 and 30. Signals are applied at each of the two frequencies through the respective high and low frequency resonant input circuits. Separate output signals are derived in the detection circuit by use of appropriate resonant circuits 44, 45 and 38, 39. These signals at output terminals 43 and 49 are then combined, as described in the Hanken application, to provide the desired measurements of mass or moisture or both.

While the invention has been described with reference to a specific application of a two frequency resonant measuring detector it will be apparent that the principles involved are not limited to such application but are of general application. Accordingly, the invention is to be limited only by the scope of the appended claims.

I claim:

1. In a system for determining a property of a dielectric material, said system comprising a first source of electrical input signals at a high frequency, a second source of electrical input signals at a low frequency, detecting means, a measuring probe having spaced electrodes arranged for applying said input signals to at least a portion of said material and coupling said detecting means to said portion, and a balancing capacitor connected to said probe: the improvement comprising a first input circuit coupled to said first source, a second input circuit coupled to said second source, means coupled between said first input circuit and said probe and said balancing capacitor for coupling said first source to said probe and said balancing capacitor while substantially decoupling said second source from said first source, and means coupled between said second input circuit and said probe and said balancing capacitor for coupling said second source to said probe and said balancing capacitor while substantially decoupling said first source from said second source, said first input circuit as so coupled, including said probe capacitance and said balancing capacitor, being substantially resonant at said high frequency, and said second input circuit as so coupled, including said probe capacitance and said balancing capacitor, being substantially resonant at said low frequency.

2. In a system for determining a property of a dielectric material, said system comprising a first source of electrical input signals at a high frequency, a second source of electrical input signals at a low frequency, detecting means, a measuring probe having spaced electrodes arranged for applying said input signals to at least a portion of said material and coupling said detecting means to said portion, and a balancing capacitor connected in series with said probe: the improvement comprising a first input circuit coupled to said first source and capacitively coupled to said probe and said balancing capacitor, and a second input circuit coupled to said second source and coupled through inductance means to said probe and said balancing capacitor, said first input circuit as so coupled, including said probe capacitance and said balancing capacitor, being substantially resonant at said high frequency, and said second input circuit as so coupled, including said probe capacitance and said balancing capacitor, being substantially resonant at said low frequency.

3. Apparatus as set forth in claim 2 wherein said detecting means includes
a high frequency output circuit comprising
a first capacitor and a first inductor connected in series to form a circuit resonating at said high frequency, and a high frequency detector circuit connected across said first inductor,
and a low frequency output circuit comprising,
a second capacitor and a second inductor connected in series to form a circuit resonating at said low frequency, and a low frequency detector circuit connected across said second capacitor.

4. In a system for determining a property of a dielectric material, said system comprising a first source of electrical input signals at a high frequency, a second source of electrical input signals at a low frequency, detecting means, a measuring probe having spaced electrodes arranged for applying said input signals to at least a portion of said material and coupling said detecting means to said portion, and a balancing capacitor connected in series with said probe: the improvement comprising
a first balanced input circuit coupled to said first source and including
a first coupling capacitor coupling one side of said first input circuit to said probe, and
a second coupling capacitor coupling the other side of said first input circuit to said balancing capacitor, and
a second balanced input circuit coupled to said second source and including
a first coupling inductor coupling one side of said second input circuit to said probe, and a second coupling inductor coupling the other side of said second input circuit to said balancing capacitor,
said first input circuit as so coupled, including said probe capacitance and said balancing capacitor, being substantially resonant at said high frequency, and said second input circuit as so coupled, including said probe capacitance and said balancing capacitor, being substantially resonant at said low frequency.

5. In a system for determining a property of a dielectric material, said system comprising a first source of electrical input signals at a high frequency, a second source of electrical input signals at a low frequency, detecting means, a measuring probe having spaced electrodes arranged for applying said input signals to at least a portion of said material and coupling said detecting means to said portion, and a balancing capacitor connected in series with said probe: the improvement comprising
a first balanced input circuit including
a first transformer having
a first primary winding and a first secondary winding,
said first primary winding being coupled to said first source,
resonating capacitor means connected across said first secondary winding,
a first coupling capacitor connected to one end of said first secondary winding and coupling one side of said first input circuit to said probe, and
a second coupling capacitor connected to the other end of said first secondary winding and coupling the other side of said input circuit to said balancing capacitor, and
a second balanced input circuit including
a second transformer having
a second primary winding and a second secondary winding,
said second primary winding being coupled to said second source,
a first coupling inductor connected to one end of said second secondary winding and coupling one side of said second input circuit to said probe, and a
second coupling inductor connected to the other end of said second secondary winding and coupling the other side of said second input circuit to said balancing capacitor,
said first input circuit as so coupled, including said probe capacitance and said balancing capacitor, being substantially resonant at said high frequency, and
said second input circuit as so coupled, including said probe capacitance and said balancing capacitor, being substantially resonant at said low frequency.

6. Apparatus as set forth in claim 5 wherein said resonating capacitor means includes an adjustable capacitor and wherein the inductance of said first and second coupling inductors is adjustable.

References Cited by the Examiner

UNITED STATES PATENTS

| | | | |
|---|---|---|---|
| 1,941,305 | 12/1933 | Hinton | 333—76 |
| 2,151,127 | 3/1939 | Logan et al. | 324—82 X |
| 2,196,266 | 4/1940 | Landon et al. | 330—148 |
| 2,522,914 | 9/1950 | Winchell et al. | 324—128 X |
| 2,592,101 | 4/1952 | Aiken | 324—57 |
| 2,612,558 | 9/1952 | Klipsch | 330—148 |
| 2,791,723 | 5/1957 | Nagy et al. | 313—108 X |
| 2,993,170 | 7/1961 | Smith | 324—81 |
| 3,155,902 | 11/1964 | Walls | 324—61 |

FOREIGN PATENTS 217,898  10/1958  Australia.

WALTER L. CARLSON, *Primary Examiner.*

SAMUEL BERNSTEIN, FREDERICK M. STRADER,
*Examiners.*